US008811242B2

(12) United States Patent
Falk et al.

(10) Patent No.: US 8,811,242 B2
(45) Date of Patent: Aug. 19, 2014

(54) METHOD AND ARRANGEMENT FOR PROVIDING A WIRELESS MESH NETWORK

(75) Inventors: Rainer Falk, Erding (DE); Florian Kohlmayer, Starnberg (DE)

(73) Assignee: Unify GmbH & Co. KG, Munich (DE)

( * ) Notice: Subject to any disclaimer, the term of this patent is extended or adjusted under 35 U.S.C. 154(b) by 1578 days.

(21) Appl. No.: 12/310,373

(22) PCT Filed: May 30, 2007

(86) PCT No.: PCT/EP2007/055231
§ 371 (c)(1),
(2), (4) Date: Feb. 23, 2009

(87) PCT Pub. No.: WO2008/022821
PCT Pub. Date: Feb. 28, 2008

(65) Prior Publication Data
US 2009/0279518 A1 Nov. 12, 2009

(30) Foreign Application Priority Data
Aug. 24, 2006 (EP) ..................................... 06017663

(51) Int. Cl.
*H04B 7/00* (2006.01)
(52) U.S. Cl.
USPC ......... 370/310; 370/338; 370/389; 370/395.2
(58) Field of Classification Search
USPC .................................. 370/310, 338; 709/225
See application file for complete search history.

(56) References Cited

U.S. PATENT DOCUMENTS 6,587,680 B1 * 7/2003 Ala-Laurila et al. .......... 455/411
7,103,359 B1 * 9/2006 Heinonen et al. ............. 455/436
7,738,415 B2 * 6/2010 Chou ............................ 370/328
2002/0197979 A1 * 12/2002 Vanderveen .................. 455/410
2003/0235305 A1 * 12/2003 Hsu .............................. 380/247
2004/0141468 A1 7/2004 Christensen et al.
2005/0201342 A1 * 9/2005 Wilkinson et al. ........... 370/338
2005/0278532 A1 * 12/2005 Fu et al. ........................ 713/169
2006/0114863 A1 6/2006 Sanzgiri et al.

(Continued)

FOREIGN PATENT DOCUMENTS

EP 1635528 A1 3/2006

OTHER PUBLICATIONS

IEEE Computer Society; 802.11i IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 6: Medium Access Control (MAC) Security Enhancements; IEEE Standards, IEEE, New York, US, Bd. 802.11, Jul. 23, 2004, pp. 1-175; XP002402752.

Faccin S. M. et al.; Mesh WLAN Networks: Concept and System Design; IEEE Wireless Communications, Bd. 13, Nr. 2, Apr. 2006, pp. 10-17; XP002415589, ISSN: 1536-1284.

(Continued)

*Primary Examiner* — Brandon Renner
*Assistant Examiner* — Scott M Sciacca
(74) *Attorney, Agent, or Firm* — Buchanan Ingersoll & Rooney PC

(57) ABSTRACT

A method and an arrangement for providing a wire-free mesh network are provided. An approval procedure is carried out in situations in which a subscriber who is registering on the mesh network transmits an MAC address which already exists in the mesh network, such that two different subscribers within the mesh network never have identical MAC addresses.

17 Claims, 10 Drawing Sheets

(56) References Cited

U.S. PATENT DOCUMENTS

| | | | |
|---|---|---|---|
| 2006/0133341 A1* | 6/2006 | Chari et al. | 370/338 |
| 2006/0268908 A1* | 11/2006 | Wang et al. | 370/401 |
| 2007/0060127 A1* | 3/2007 | Forsberg | 455/436 |
| 2007/0082656 A1* | 4/2007 | Stieglitz et al. | 455/411 |
| 2007/0189249 A1* | 8/2007 | Gurevich et al. | 370/338 |
| 2008/0250496 A1* | 10/2008 | Namihira | 726/22 |
| 2009/0262718 A1* | 10/2009 | Meier et al. | 370/338 |
| 2010/0110975 A1* | 5/2010 | Cagenius | 370/328 |

OTHER PUBLICATIONS

"Draft Amendment to Standard for Information Technology—Telecommunications and Information Exchange Between Systems—LAN/MAN Specific Requirements—Part 11: Wireless Medium Access Control (MAC) and physical lay (PHY) specifications: Amendment: ESS Mesh Networking" IEEE P802.11s/DO.02. Jun. 2006; 802.11 Working Group of LAN/MAN Committee; XP55021575.

\* cited by examiner

Mesh subscribers

Non-mesh subscribers

| RA | TA | DA | SA | DATA | FCS |

METHOD AND ARRANGEMENT FOR PROVIDING A WIRELESS MESH NETWORK

CROSS REFERENCE TO RELATED APPLICATIONS

This application is the US National Stage of International Application No. PCT/EP2007/055231, filed May 30, 2007 and claims the benefit thereof. The International Application claims the benefits of European Patent Office application No. 06017663.3 EP filed Aug. 24, 2006, both of the applications are incorporated by reference herein in their entirety.

FIELD OF INVENTION

The invention relates to a method for providing a wireless mesh network and an arrangement for providing a wireless mesh network.

BACKGROUND OF INVENTION

A wireless mesh network is a meshed network implemented for example in a Wireless Local Area Network (WLAN). In a mesh network a mobile node can forward data originating from another mobile node to a further mobile node or transmit it to a base station. Mesh networks can cover long distances, in particular in uneven or problematic terrain. Mesh networks also operate very reliably, since each mobile node is connected to several other nodes. If a node fails, for example due to a hardware defect, its adjacent nodes seek an alternative data transmission route. Mesh networks can include fixed or mobile devices.

As mentioned above, FIG. 1 shows a mesh network MESH, which is connected to an infrastructure network INFRA-STRUCTURE NETWORK and as well as nodes MP, MAP of the mesh network also has non-mesh stations, for example a station STA operating according to WLAN. This station STA operating according to WLAN is connected to the mesh network MESH by way of a mesh network node MAP, which operates as a WLAN access point.

The mesh network MESH of the WLAN station STA here can also allow access to an infrastructure network INFRA-STRUCTURE NETWORK, for example a company network or the internet.

In this process mesh nodes MP and/or WLAN stations STA are authenticated for example using an authentication server AAA-server (AS), with the mesh network MESH being coupled to the infrastructure network INFRASTRUCTURE NETWORK by way of a gateway component GW in the example shown.

FIG. 2 shows an independent mesh network MESH, as known in the prior art. Independent here means that the mesh network MESH is formed exclusively from mesh nodes MP.

These can be both infrastructure nodes and also so-called end user nodes, such as a notebook or PDA for example.

In contrast FIG. 3 shows an independent mesh network with an access point MAP, as known from the prior art, which allows non-mesh-capable devices, such as the WLAN stations STA shown for example, to register with the network MESH. The WLAN stations STA shown do not however take part in mesh routing themselves.

SUMMARY OF INVENTION

In the arrangements shown according to the prior art it is standard for the devices to identify themselves in the network by means of a so-called MAC address (Media Access Control Ethernet ID). A MAC address here is the layer-2 address of a node for communication in communication networks based on the IEEE 802 standards, for example in the case of WLAN according to IEEE 802.11 and in the case of the mesh networks MESH shown according to IEEE 802.11S. This address should generally be connected to the respective hardware in a universally unique manner.

It is however known that non-trusted subscribers ATTACKER MP can use the MAC address of a trusted subscriber GOOD MP erroneously or completely intentionally. Such a manipulation, also known as MAC address spoofing, causes disruption of the targeted networks, for example denial of service (DoS) attacks, because the sacrificial subscriber GOOD MP can no longer communicate, as their wireless link is no longer valid. Also the communication session of the trusted subscriber GOOD MP can be taken over at a WLAN hotspot with a purely http-browser-based registration.

Measures for identifying such WLAN MAC address spoofing are disclosed in Joshua Right Detecting Wireless LAN MAC Address Spoofing, 21.01.2003, with which firstly a check takes place to determine whether a so-called Organizationally Unique Identifier OUI allocated exclusively to the producers (see IEEE standards), which is part of the transmitted MAC address, is in fact allocated to a producer. WLAN MAC sequence numbers of a subscriber, which generally increase sequentially, can also be analyzed, such that as soon as a bigger gap occurs, it is an indication that the corresponding MAC frame was sent by another station (attacker).

This has the disadvantage that the OUI check is only effective if the MAC address is generated randomly, but not if the attacker ATTACKER MP simply uses the MAC address of another trusted subscriber GOOD MP. The attacker ATTACKER MP can also generate MAC addresses randomly, provided that their OUI is allocated.

A method for protecting IEEE 802.11 data traffic against MAC address spoofing is also known from the patent application US 2006/0114863, in which protection from MAC address spoofing takes place in WLAN networks such that an assignment table is created for the MAC address, and a user identity used during the WLAN registration and during subsequent WLAN registrations the MAC address used and the user identity are checked to determine correspondence with the entry in the assignment table and if they do not correspond, the registration is rejected.

The object of the present invention is therefore to specify an improved method and arrangement for providing a wireless mesh network.

With the inventive method for providing a wireless local network, in which stationary communication entities embodied according to the IEEE 802.11 standard and its derivatives, in particular IEEE 802.15 or IEEE 802.16, and mobile communication entities are connected as a subnetwork in the manner of the mesh, a communication entity registering with the subnetwork transmits a registering MAC address to the subnetwork, a check is carried out such that the registering MAC address is compared with the MAC addresses that are reachable on the part of the subnetwork and if the registering MAC address is disjoint in respect of the reachable MAC addresses, the registering communication entity is connected in the manner of a station of the subnetwork, while if the registering MAC address is already reachable in the subnetwork, an approval procedure is carried out such that such that use of the registering MAC address by two different communication entities within the subnetwork is prevented.

One advantage of the inventive method is the immunization against effects of MAC address spoofing, since this inventive procedure specifically prevents registration using a MAC address that is already reachable, which, in contrast to approaches known from the prior art, does not require previously stored relationships between devices and MAC addresses, etc.

In a development of the invention, the approval procedure takes the form of rejection of the registering communication. This is the simplest variant for ensuring that MAC address spoofing is prevented, as no further enquiries and data transmissions are required. It is also the quickest option for completing an approval procedure.

Alternatively the approval procedure takes the form of conversion of the registering MAC address such that a MAC address that is disjoint in respect of the reachable MAC addresses is allocated to the registering communication entity within the subnetwork.

This means that for the subnetworks only a MAC address that is valid locally for said subnetworks is allocated internally, regardless of the MAC address assigned in a universally unique manner to each device, thereby preventing spoofing; in other words MAC address spoofing has a negative effect on the function of the mesh subnetwork, in particular the routing and forwarding of data with the mesh subnetwork.

The disjoint MAC address is preferably generated on the part of the subnetwork here, since this latter has information about existing MAC addresses and/or the addresses that are valid in the local network. It is also advantageous here if the disjoint MAC address is generated based on a pseudo-random sequence, in particular a "Number Used Once, Nonce" generated just once.

It is also advantageous if, in a development, the disjoint MAC address is selected so that it is disjoint in respect of MAC addresses allocated universally, in particular on the part of organizations, as according to the OUI. This ensures that there are no collisions with universally assigned MAC addresses.

The $41^{st}$ bit of the disjoint MAC address is preferably allocated the value 1 here, so that local validity is identified in a simple manner.

In a further advantageous embodiment of the invention the approval procedure takes the form of a check carried out on the part of the subnetwork on the identity of the registering communication entity with the first communication entity determined by way of the reachable MAC address corresponding to the registering MAC address. It can thus be determined whether the registering communication entity is an already known communication entity, which simply wishes to set up a further link in the mesh network, as should also be ensured according to mesh architecture, and therefore is not a case of spoofing but a legitimate registration attempt and should therefore be permitted.

In one development the identity check should be carried out such that the subnetwork transmits a first item of check information to the first communication entity by way of a route in the subnetwork established to the communication entity determined by way of the reachable MAC address corresponding to the registering MAC address, the subnetwork transmits a request to the first communication entity to return the first item of check information and the subnetwork awaits the return of the first item of check information by way of a route established in the context of the registration attempt on the part of the registering station, in other words by way of the link to be set up, in the subnetwork, after which if no return is made the registering communication entity is rejected or if the return is made the correlation of the first item of check information with the returned item of check information is checked and, if a specific degree of correlation is achieved, in particular in the case of identity, of the first item of check information with the returned item of check information, the registering communication entity is connected in the manner of a station of the subnetwork; otherwise the registering communication entity is rejected.

This means that a check parameter is sent from the network to the already registered station by way of the existing route and an expectation that this check parameter will returned by way of the route to be set up is realized, this being successfully completed only if the device registering is the same device that is already incorporated in the network at the reachable MAC address.

In a further variant of the identity check the subnetwork transmits a first item of check information to the first communication entity by way of a route in the subnetwork established in the context of the registration attempt on the part of the registering station, the subnetwork transmits a request to the first communication entity to return the first item of check information, the subnetwork awaits the return of the first item of check information by way of a route in the subnetwork established to the communication entity determined by way of a reachable MAC address corresponding to the registering MAC address; also if no return is made the registering communication entity is rejected, while if the return is made, it is checked whether the first item of check information correlates with the returned item of check information so that if a specific degree of correlation is achieved, in particular in the case of identity, of the first item of check information with the returned item of check information, the registering communication entity is connected in the manner of a station of the subnetwork; otherwise rejection of the registering communication entity again takes place. This is a variant in which the check parameter is sent from the network to the station just registering, with the route to be set up being used for this purpose and the network then waiting for the check parameter to be returned by way of the existing route. This can only happen if the registering device and the already reachable device are identical and both routes therefore lead to it, thus ensuring reliable verification of the identity of the registering and already reachable station.

The subnetwork preferably initiates transmission of the second and/or third item of check information or alternatively transmission of the second and/or third item of check information takes place automatically on the part of the registering communication entity.

In a further variant for the identity check a fourth item of check information calculated on the part of a cryptographic key authenticating the first communication entity determined by way of the reachable MAC address corresponding to the registering MAC address, in particular a first session key resulting from a network registration according to the so-called extensible authentication protocol EAP and available to the registering communication entity is transmitted by way of a route in the subnetwork established in the context of the registration attempt on the part of the registering station; the subnetwork determines the validity of the fourth item of check information based on a second cryptographic key authenticating the communication entity determined by way of a reachable MAC address corresponding to the registering MAC address, in particular a second session key resulting from a network registration according to the extensible authentication protocol EAP and available to the subnetwork; where there is validity, the registering communication entity is connected in the manner of a station of the subnetwork, otherwise the registering communication entity is rejected.

Alternatively the identity check takes place such that the registering communication entity transmits a fifth item of check information calculated on the basis of a first cryptographic key authenticating the registering communication entity, in particular a first session key resulting from a network registration according to the so-called extensible authentication protocol EAP and available to the registering communication entity to the subnetwork by way of a route established to the communication entity determined by way of a reachable MAC address corresponding to the registering MAC address; the subnetwork also determines the validity of the item of check information based on a second cryptographic key authenticating the registering communication entity, in particular a second session key resulting from a network registration according to the extensible authentication protocol EAP and available to the subnetwork; where there is validity the registering communication entity is connected in the manner of a station of the subnetwork, otherwise the registering communication entity is rejected.

These two variants allow particularly reliable verification of identity, since this is based on encryption information assigned to the respective communication entities or to existing links and/or links be set up to them.

The first and/or second session keys here are preferably generated as Master Session Keys MSK formed according to the extensible authentication protocol EAP, so that the inventive method can be implemented in conventional EAP environments or those based on EAP.

Alternatively or additionally the first and/or second session key can be generated as extended master session keys EMSK formed according to the extensible authentication protocol EAP.

A function according to a cryptographic hash function, in particular the SHA-1, SHA-256 or MD5 hash function, is suitable here for calculating the first, second, third, fourth and/or fifth item(s) of check information, as is it possible to use known routines.

Alternatively or additionally it is advantageous if keyed hash functions, such as in particular EAS-CBC-MAC, HMAC-SHA1, HMAC-SHC256, HMAC-MD5, are used to calculate the first, second, third, fourth and/or fifth item(s) of check information, with the HMAC functions being defined according to RFC2104.

In one advantageous embodiment the approval procedure is initiated when the registering communication entity registers with the subnetwork as a subscriber in the manner of the mesh, so that mesh subscribers and non-mesh subscribers can be distinguished and different variants of the inventive method can be deployed.

In a further advantageous embodiment first, second, third, fourth and/or fifth item(s) of check information is/are generated in particular as a pseudo-random code, for example a nonce value.

Alternatively or additionally in a further advantageous embodiment the first, second, third, fourth and/or fifth item(s) of check information is/are transmitted as a hash code generated from a value produced in particular as a pseudo-random code, for example a nonce code. This allows additional protection and a higher degree of verification.

In a further alternative or additional embodiment a hash code generated from an operating parameter of the registering communication entity and/or first communication entity is transmitted as the first, second, third, fourth and/or fifth item(s) of check information. This has the advantage that known parameters can be used, so that no parameter has to be generated and the close link between said parameters and the terminal means that said terminal can be identified in a simple manner.

The object underlying the invention is also achieved by the arrangement for providing the wireless local network, which is characterized by means for implementing the method.

BRIEF DESCRIPTION OF THE DRAWINGS

Further details and advantages of the invention are described in more detail below based on the prior art shown in FIGS. 1 to 4 and exemplary embodiments shown in FIGS. 5 to 12, in which figures.

DETAILED DESCRIPTION OF INVENTION

Figure 1:
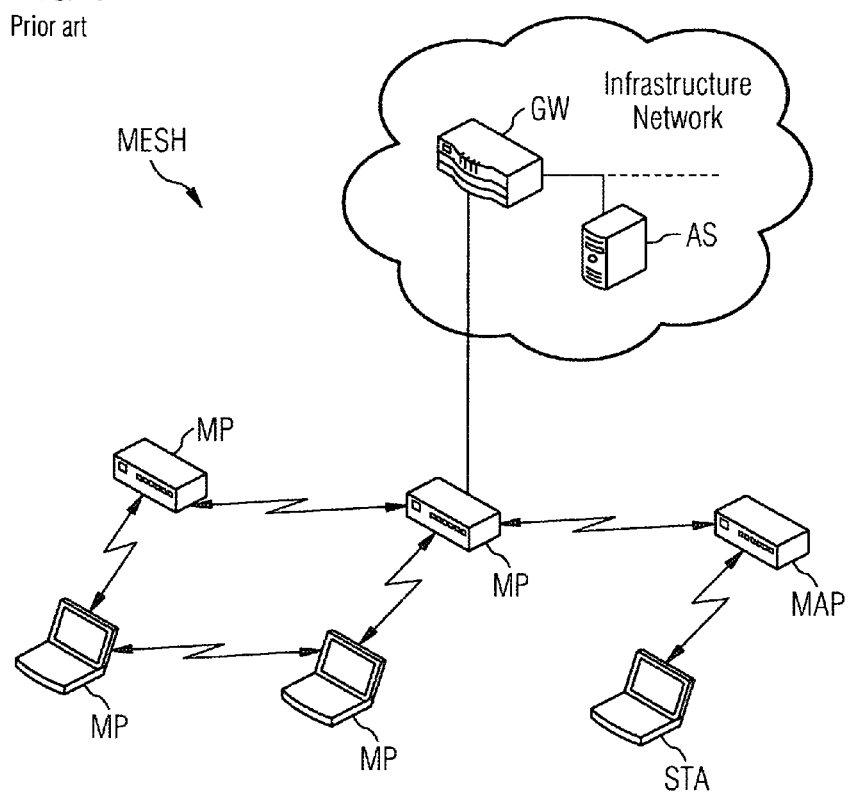
FIG. 1 shows a mesh network scenario according to the prior art.
Figure 2:
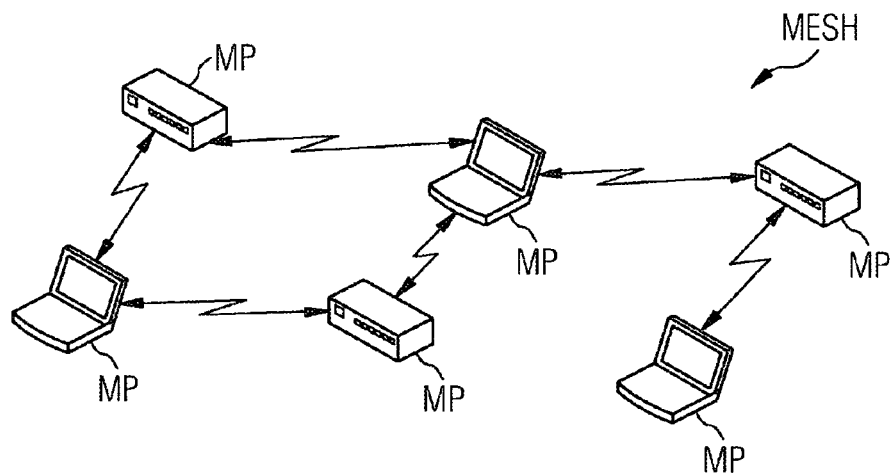
FIG. 2 shows an independent mesh network according to the prior art.
Figure 3:
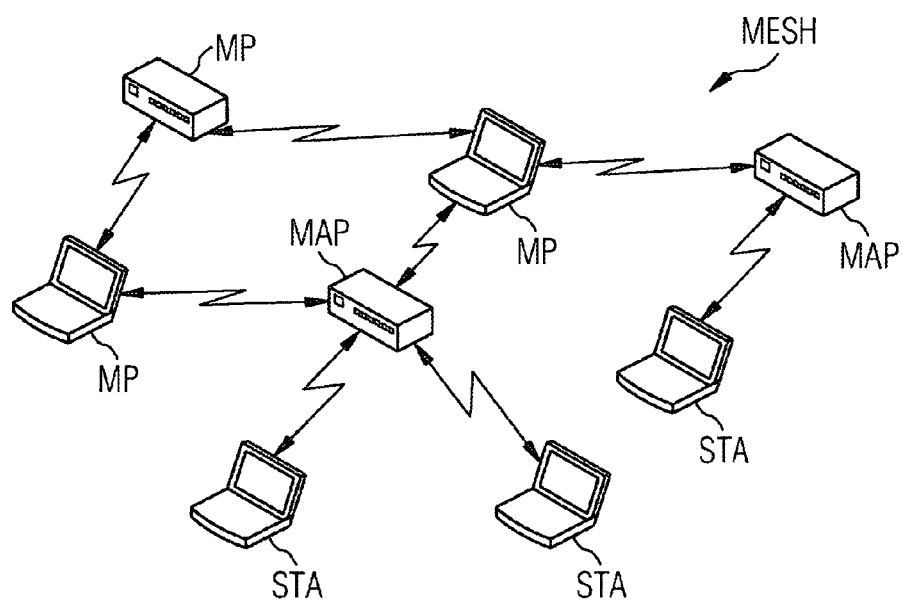
FIG. 3 shows a mesh network according to the prior art with an access point for non-mesh subscriber stations.
Figure 4:
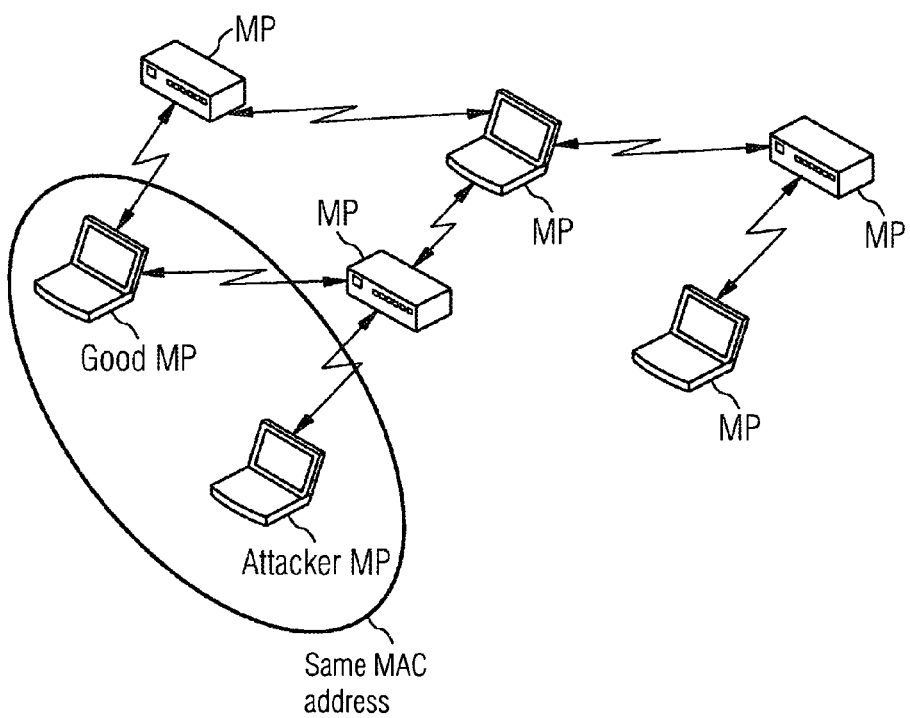
FIG. 4 shows a scenario of a mesh ownership check according to the prior art.
Figure 5:
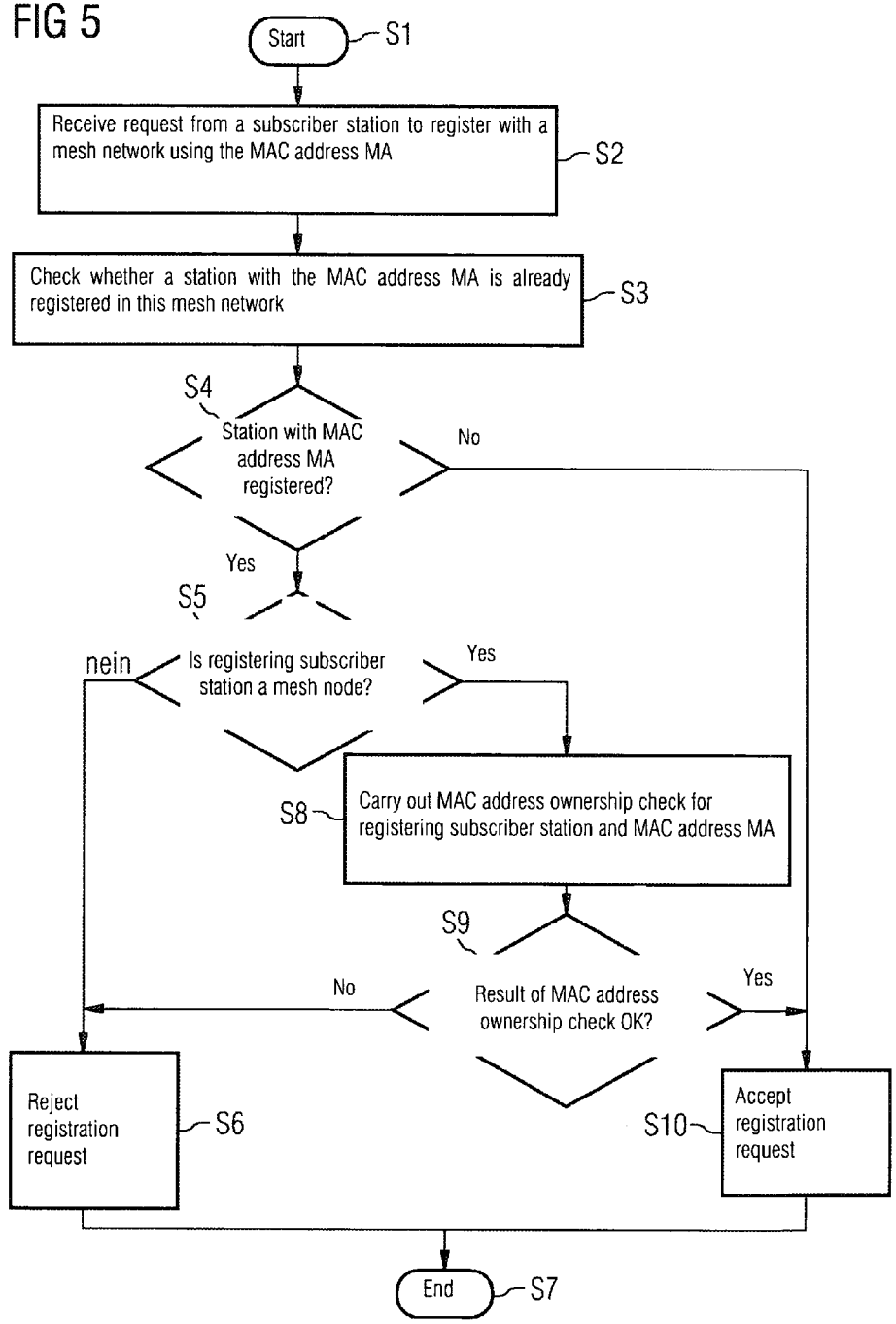
FIG. 5 shows a flow diagram of an exemplary embodiment of the invention.

Based on the scenarios shown in FIGS. 1 to 4 and the resulting problems, the invention advantageously intervenes and resolves the above-mentioned problems for a mesh network, as shown in the exemplary embodiment according to FIG. 5 based on a flow diagram illustrating the exemplary embodiment.

The inventively embodied procedure starts here with a first step S1, showing an initial state START, and after the occurrence of an event, specifically receipt of a request from a subscriber station to register with a mesh network using the MAC address MA, moves in a second step S2 to a third step S3, in which it is checked whether a station with the transmitted MAC address MA is already registered in the mesh network.

This check, carried out in a fourth step S4, results, if it is an already registered reachable MAC address MA, in a further enquiry in a fifth step S5, in which it is checked whether the registering subscriber station is a mesh node, i.e. a mesh subscriber, or a non-mesh station. In a sixth step S6 the registration request is rejected if it is a non-mesh station. Otherwise, in other words if it is a mesh node, in an eighth step S8 a check takes place to determine MAC address ownership for the registering subscriber station and the MAC address MA. During this MAC address ownership check it is checked whether the subscriber station is authorized to use to the transmitted MAC address MA.

If the enquiry shows that the result of the MAC address ownership check is OK, in other words it is an already registered subscriber station, in a tenth step S10 the registration request is accepted and the subscriber station can set up this link. Otherwise the registration request is rejected again as in the sixth step S6, so that the inventive method reaches an end state in a seventh step S7.

It is thus a core of the invention that during network access by a subscriber to a mesh network using a MAC address, it is checked by the mesh network whether a subscriber node with the MAC address used by the registering subscriber is already registered and is thus reachable in this network, with the registering subscriber being accepted, if the MAC address is not yet reachable in said network, but with the response being as described above if a subscriber with the MAC address is reachable.

There are also alternatives to the approval procedure described above. It could be for example that when it is detected in the fourth step S4 that it is an already reachable MAC address, the registering subscriber is rejected immediately.

A further alternative or addition to the described proceedings in the context of the approval procedure is to carry out a MAC address translation, in other words replacing MAC addresses, as is also known for example with the so-called network address translation of IP addresses to convert private IP addresses to public IP addresses. However here a first MAC address is converted respectively to a second MAC address assigned to it, while with network address translation a number of private IP addresses are converted to the same public IP address.

According to the invention the MAC address given by the registering subscriber would be replaced by a free MAC address in respect of communication within the network, with the free MAC address meaning that it is an address that is not currently being used within the relevant network, in other words it is disjoint in respect of the reachable MAC addresses.

The replacement address can be generated here by pseudo-random codes, with this preferably being restricted to a MAC address domain, which is not an address allocated to defined organizations according to OUI.

This can be ensured for example in that the $41^{st}$ bit, the so-called "U/L" for Universal/Local bit of the MAC address, has the value 1, so that this MAC address is not universally unique but is administered locally and is therefore only unique there. The effect is then that a registering subscriber with an external non-unique MAC address is allocated an internally unique address uniquely as a result.

There are a number of implementation variants for the MAC address ownership check shown in the flow diagram and these are described in more detail below.

The basic core concept of the MAC address ownership check is that the registering station must demonstrate knowledge of a MAC ownership check parameter during registration. The condition that allows an identity check in this process is that the check parameter is only known to the station that has already registered and is reachable.

This check parameter can be a number generated in a pseudo-random manner, a so-called nonce or a cryptographic value, i.e. a value calculated with the aid of cryptographic methods and a key or another known parameter, such as a serial number or counter value for example.

If the registering station demonstrates knowledge of this check parameter, it is accepted. This demonstration is preferably provided by transmitting the check parameter on at least two different routes. One route is always the route to be set up and the other can be selected freely from already existing routes.

Implementation variants result from different possible demonstration sequences.

For example, a sequence can be such that the check parameter is sent from the network to the already registered station by way of the already existing route and the network then waits for the check parameter to be returned by way of the route to be set up. This ensures that the registering station and the already registered station are identical and only the registering station wishes to set up a further route, as is possible in principle according to mesh architecture, as the return of the check parameter by the route to be set up is only possible if they are one and the same station. An attacker would not have this information.

One variant of this is that the check parameter is sent from the network to the station just registering by way of the route to be set up and the subsequent return of the check parameter by way of the already existing route is then awaited. This is essentially only a reversal of the transmission directions.

In a further variant the check parameter, for example the above-mentioned random number generated in a pseudo-random manner or nonce, is transmitted from the registering station to the network by way of the two routes mentioned, namely the route to be set up and the previously existing route to the network. The network then only has to check the identical nature of the two parameters arriving by way of the different routes and in the simplest instance if the check parameters are identical or there is a high degree of correlation approve the registering station correspondingly and if they are not identical reject it. Sending can be initiated here by the stations involved or the check parameter is requested on the initiative of the network by way of the two different routes mentioned.

A further possibility is that a check parameter is calculated using a cryptographic key by the station just registering. This can be done for example on the basis of a master session key MSK resulting from an EAP-based network registration. After calculation the check parameter is sent by way of the already existing route to the network, which itself calculates a check parameter for cross-checking purposes using the same key and checks it against the one received to determine identity.

Similarly the registered station can calculate check parameters based on the cryptographic key assigned to it and send them to the network by way of the route to be set up.

The core of the ownership check is therefore
sending the check parameter,
sending a value derived from the check parameter, for example the hash value of the check parameter or the input value of a hash function, which gives the check parameter as a result, for example SHA-1, SHA-256 or MD5,
using the check parameter as input to calculate a cryptographic checksum, the so-called message authentication code, for example HMAC-SHA1, HMAC-SHA256, HMAC-MD5 or AES-CPC-MAC and sending the result.

The two first variants of the demonstration sequences, i.e. rejection or MAC address conversion are advantageous here if it is known that a subscriber can or should only register once with this network, as is the case for example with conventional WLAN stations, while the third variant, in other words the ownership check, can be deployed expediently when a subscriber can legitimately maintain a number of access links to this network, as is permitted for example for mesh nodes within a mesh network.

Therefore a development also provides for a distinction between different types of subscriber, in the above instance for example specifically between mesh subscribers and non-mesh subscribers, with a subscriber station being given the freedom to register with the network as a mesh subscriber or a non-mesh subscriber and with the check then being carried out in such a manner that if it registers as a non-mesh subscriber, it is checked according to the invention that no other subscriber with the same MAC address is registered as a mesh subscriber with the network. It can also be checked that no other subscriber with the same MAC address is already registered as a non-mesh subscriber with the network.

Figure 6:
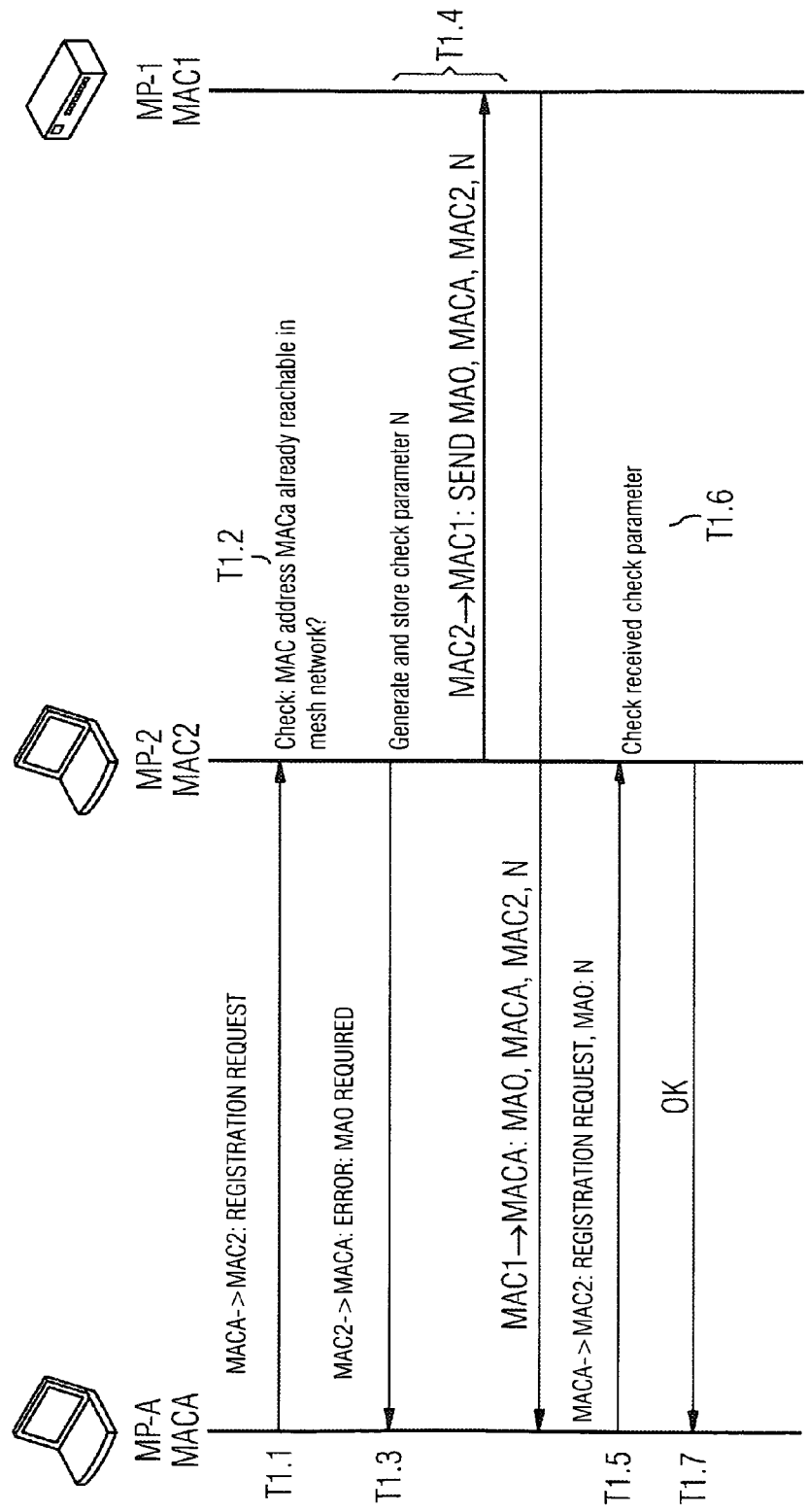
FIG. 6 shows a message flow diagram for a first variant of the inventive mesh ownership check.

FIG. 6 shows a detailed diagram of a first variant of the ownership check in the form of a message flow diagram.

It shows the message flow between a station MP-A, which has the MAC address MACA, registering with a mesh network, which consists at least of the mesh nodes MP-1 and MP-2, a first station MP-1 having a first MAC address MAC1 and the second station MP-2 having a second MAC address MAC2.

A possible message flow resulting according to the invention is shown as follows.

At a first time T1.1 the registering station MP-A sends a registration request to set up a link to a mesh node of the mesh network, in the example shown a second station MP-2.

It is then checked at a time T1.2 by MP-2 whether the MAC address of the registering station MACA is already reachable in the mesh network, in other words if a node has already registered with this address. In the example shown it should be assumed that this is the case. A check could be carried out here to determine the presence of an already existing reachable address in that the second station MP-2 searches its routing tables for an entry for the registration MAC address MACA or it could be done by means of a so-called route request message, which is preferably sent out with a destination only flag for the node with the registering MAC address MACA, to determine any existing route through the mesh network.

Since in this instance the registration MAC address MACA already represents a reachable address in the mesh network, the second communication entity MP-2 sends an error message back to the registering station MP-A at time T1.3, stating that a MAC address ownership demonstration MAO is required, this message being optional.

Furthermore at a fourth time T1.4 the second communication entity MP-2 generates a check parameter N, for example a pseudo-random number, and stores it, optionally with further data, in particular the MAC address MACA of the registering station MP-A, to use this at a later stage for the ownership demonstration, such that the second communication entity MP-2 sends this check parameter as a message to the registering station MP-A by way of a first communication entity MP-1, this message being sent first to the first communication entity MP-1, which then forwards it to the registering station MP-A.

As well as the check parameter N this message also contains the MAC addresses of the second communication entity MP-2 and the registering station MP-A as address information, so that even if the message is forwarded by way of a number of intermediate nodes, it still arrives successfully at the registering station MP-A.

On receipt of this message, at a fifth time T1.5, the registering communication entity MP-A again sends a registration request to set up a link to the second communication entity MP-2, this message also containing the check parameter N in contrast to the request sent at the first time T1.1.

Then at a sixth time T1.6 the second communication entity MP-2 can check the check parameter N sent by the registering station MP-A to determine whether it corresponds to the stored one, which should be the case in the scenario shown, so that at a seventh time T1.7 the second communication entity MP-2 sends an OK message for confirmation to the registering communication entity MP-A and the registering station MP-A is thus approved as a subscriber station in the network.

Figure 7:
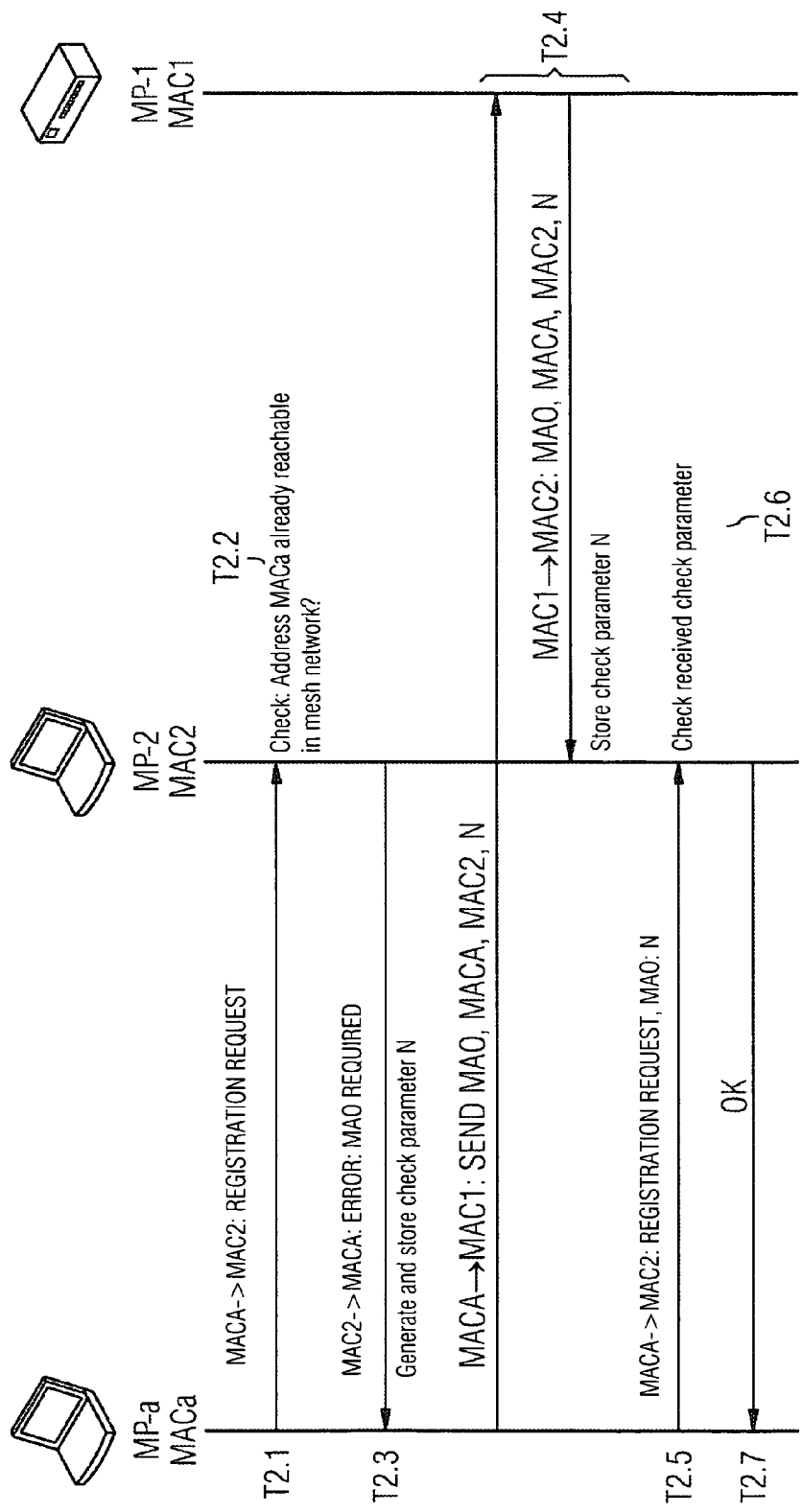
FIG. 7 shows a message flow diagram for a second variant of the inventive mesh ownership check.

FIG. 7 shows a further variant, in which the alternative realization of the demonstration sequence is such that the registering station MP-A itself generates a check parameter N, which is requested by the second communication entity MP-2 via the existing link by way of the first communication entity MP-1. In the message flow diagram shown the demonstration sequence starts at a first time T2.1 such that the registering station MP-A first sends a registration request to set up a link to the second communication entity MP-2 in the usual manner.

At a second time T2.2 the second communication entity MP-2 then checks whether the MAC address transmitted on the part of the registering communication entity MP-A, i.e. the registration address MACA, is already reachable in the mesh network, in other words a node is registered with this MAC address. This should be assumed in this example too, it being possible for the check to take place, as described with reference to FIG. 6. With this variant too, at a third time T2.3 the second communication entity MP-2 sends an error message back to the registering communication entity MP-A stating that a MAC address ownership demonstration MAO is required, so that in contrast to the variant described above the registering station MP-A itself generates a check parameter N, for example a pseudo-random number, and stores this. In order now to allow the second communication entity MP-2 to carry out the check, the registering station MP-A sends a message to the second communication entity MP-2 by way of the first communication entity MP-1, this being sent first to the first communication entity MP-1, which then forwards it to the second communication entity MP-2, said message containing the check parameter N, which was generated by the registering communication entity MP-A. The communication entity stores the received check parameter N and optionally further data, in particular the MAC address MACA of the registering station MP-A.

At a fifth time T2.5 the registering communication entity again sends a registration request to set up a link to the second communication entity MP-2, this also containing the check parameter N in contrast to the message sent at the first time T2.1.

At a sixth time T2.6, after the second communication entity MP-2 has received the message from the registering communication entity MP-A, a check is carried out by the second communication entity MP-2 to determine whether the check parameter sent by the registering communication entity MP-A corresponds to the check parameter received by way of the first communication entity MP-1, as is assumed in this example, so that at a seventh time T2.7 the second communication entity MP-2 sends an OK message for confirmation to the registering communication entity MP-A and allows this subscriber station access to the network.

An alternative would be for the registering communication entity MP-A to insert a check parameter into the message during the first registration, resulting in an almost identical sequence, with the only difference being that the first two messages are omitted.

The check parameters here can be random numbers generated in a pseudo-random manner (nonce) in particular.

Figure 8:
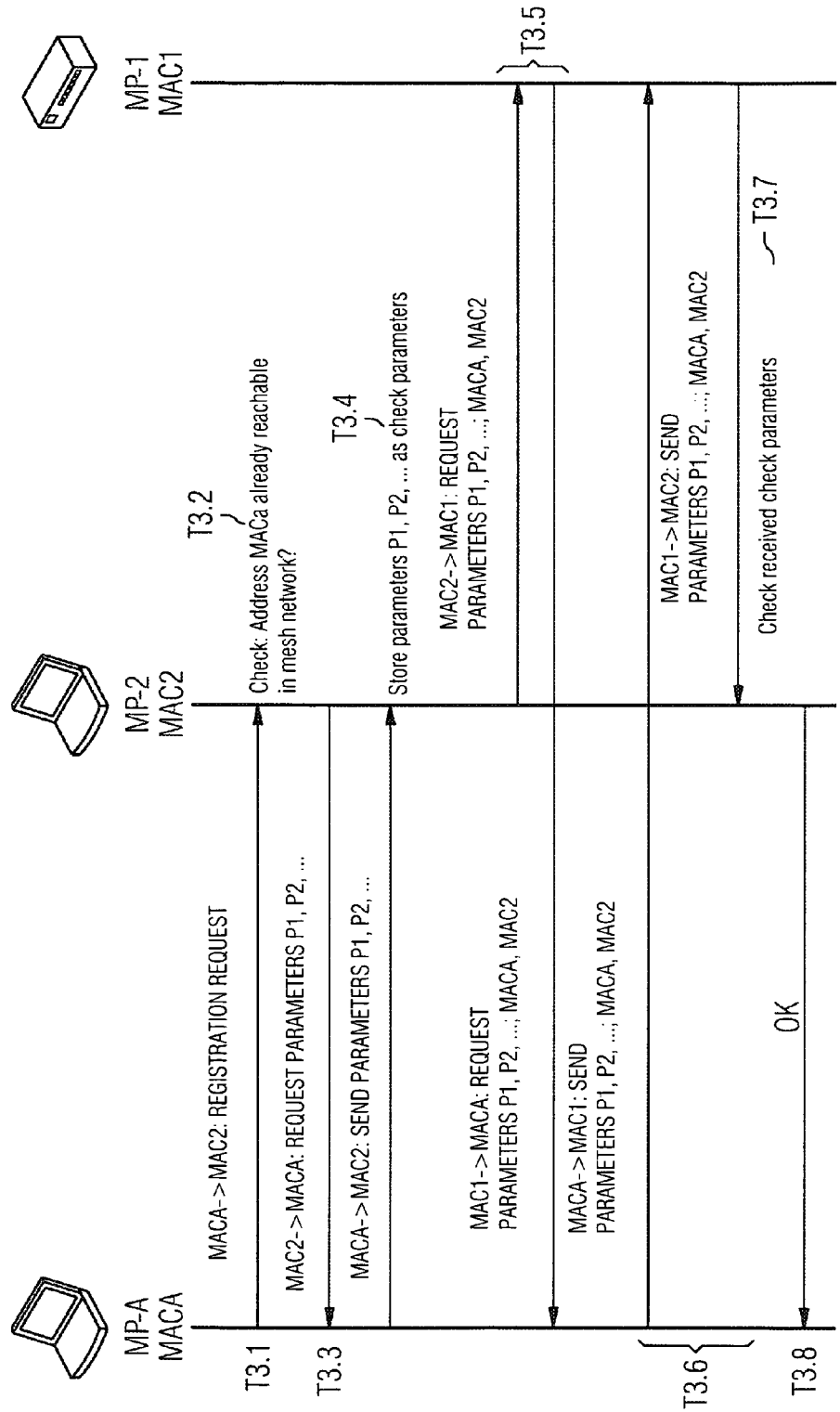
FIG. 8 shows a message flow diagram for a third variant of the inventive mesh ownership check.

FIG. 8 shows a further variant and describes it using the example of a message flow diagram, in which the generation of a check parameter is dispensed with and instead the registering station MP-A uses existing information, i.e. parameters, which is requested on the part of the second communication entity MP-2 by way of both routes, i.e. once by way of the route to be set up and by way of the already existing route.

This variant has the advantage that any parameters can be requested, allowing a check in which the usual registration procedure itself does not have to be modified. It is sufficient simply for it to be possible to request parameter values assigned to the registering communication entity MP-A.

These parameters can in particular be serial numbers of the registering communication entity MP-A, the type, model or software version of said communication entity; they can also be counter values of the registering communication entity MP-A, for example packet counters, sequence number counters for routing messages, the specific route request sequence number of the registering communication entity MP-A, in other words two route request messages are sent to it by way of the two routes mentioned, to which it must respond with the respectively appropriate, i.e. very close sequence number, it being necessary here to ensure that no data relating to the destination sequence number is contained in the route request transmitted by way of the link or route to be set up, as otherwise a potential attacker node would learn the current and therefore the expected value.

During the subsequent check it is then tested whether the values are identical or whether the counter values, which may be different because the requests are made at different times, are sufficiently close to one another. A threshold value comparison for example is preferable for this.

The messages flow as follows.

At a first time T3.1 the known registration request is sent on the part of the registering communication entity MP-A, containing the registration address MACA, to the second communication entity MP-2, whereupon this latter checks whether the transmitted registration address MACA is already reachable in the mesh network and at a third time T3.3 sends a request for any parameters to the registering station MP-A, whereupon the registering station MP-A sends the corresponding parameters to the second communication entity MP-2, which then stores these at a fifth time T3.5 and at a sixth time T3.6 sends a request for the same parameters by way of the first communication entity MP-1 to the registering communication entity MP-A, whereupon the registering communication entity MP-A transmits the requested parameters by way of the first communication entity MP-1 to the second communication entity MP-2, so that at an eighth time T3.8 the second communication entity MP-2 can transmit an OK message to the registering station MP-A, thus allowing this station access to the network.

One alternative to this is to set the link up with certain conditions. The OK message would then be sent directly after the registration request and then in a conditional phase the checks would be carried out, as described above, so that, if the result of the checks is negative, the direct link is canceled again. The direct link between the registering station MP-A and the second communication entity MP-2 is then preferably only treated as existent by the second communication entity MP-2 for routing purposes if the check is successful, i.e. after the conditional phase.

Figures 9, 10:
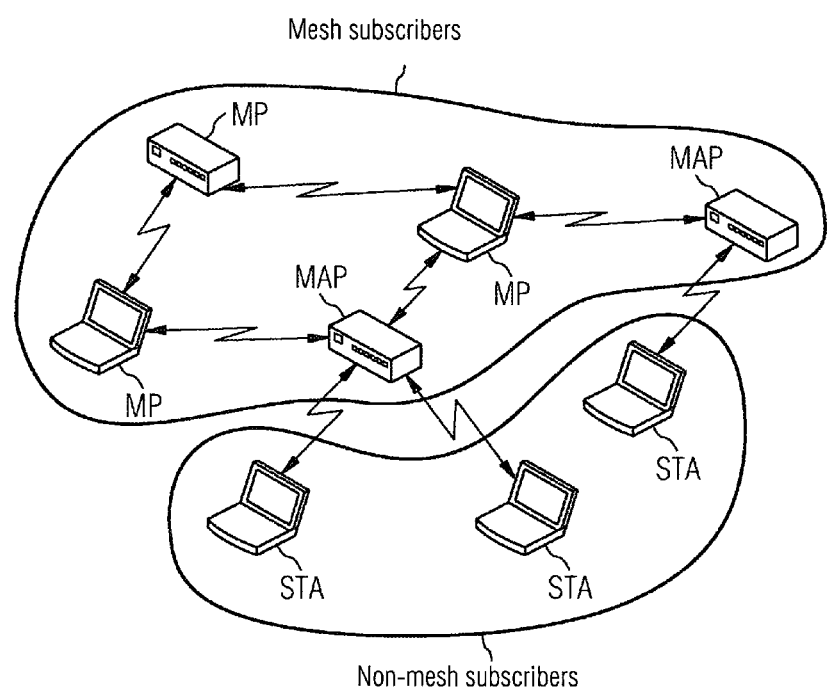
FIG. 9 shows a scenario with non-mesh subscriber stations connected by way of mesh access points according to the prior art.
FIG. 10 shows a MAC data frame according to the prior art.

FIG. 9 shows a scenario in which during the registration of a node as a non-subscriber, i.e. for example as a WLAN station STA at a mesh access point MAP, the mesh network, i.e. one of the mesh access points MAP, checks whether a mesh node is already registered within the network using the same MAC address as the registering station that is registering as a non-mesh subscriber.

The particular feature of this illustrated example is that only the MAC address of a node is checked during registration of a station as a non-mesh subscriber and only one check takes place in respect of those MAC addresses that belong to a mesh node, in other words a subscriber registered as a mesh subscriber.

This ensures that no non-mesh subscriber uses the MAC address of a mesh node or is visible with this MAC address within the mesh network. It can be seen that a node is not a mesh subscriber by an entry in a table with a set flag, known as "isProxied" (see IEEE 802.11s D0.02, section 11A.3.5.2 MP Proxy Table), while a mesh node belonging to a mesh subscriber would be shown in the table with a flag that is correspondingly not set.

According to the invention the following measures could be taken if the non-mesh subscriber station has an address which is identical to a mesh subscriber station and either the registration of the corresponding non-mesh station is rejected or the MAC address used by the non-mesh station is converted to a free MAC address using MAC address translation.

In one variant the check could take place in such a manner that it is determined whether the MAC address is already in use both in respect of mesh subscribers and in respect of non-mesh subscribers; in other words it is checked whether any node MP, MAP, STA is reachable at this MAC address.

This variant is particularly advantageous when no information is available to indicate whether a node with a specific MAC address is itself involved in mesh routing.

The MAC address conversion MAC address translation will be described in more detail with reference to FIGS. 10 and 11.

FIG. 10 shows the structure of a MAC frame defined according to IEEE 802.11, which according to the standard can contain up to four address fields, so-called MAC addresses (see also IEEE 802.11 section 7.2).

These can be the so-called source address SA, the destination address DA, the transmitting station address TA, or the so-called receiving station address RA.

The source address SA here refers to the address of the original sender, while the destination address DA indicates the address of the final receiver node.

Generally however frames are forwarded by way of a number of intermediate nodes within a mesh network, so that the address fields transmitting station address TA and receiving station address TA are used for this purpose.

The transmitting station address TA and the receiving station address RA are always included in this frame, while the source address SA and the destination address DA are only filled as required, i.e. when they are different from the transmitting station address TA or the receiving station address RA.

In principle the data frame also contains a field for useful data DATA and a field containing the checksum FCS.

Further header fields that are not relevant for the description, such as frame control, duration/ID or sequence control, are not shown for the sake of simplicity.

Figure 11:
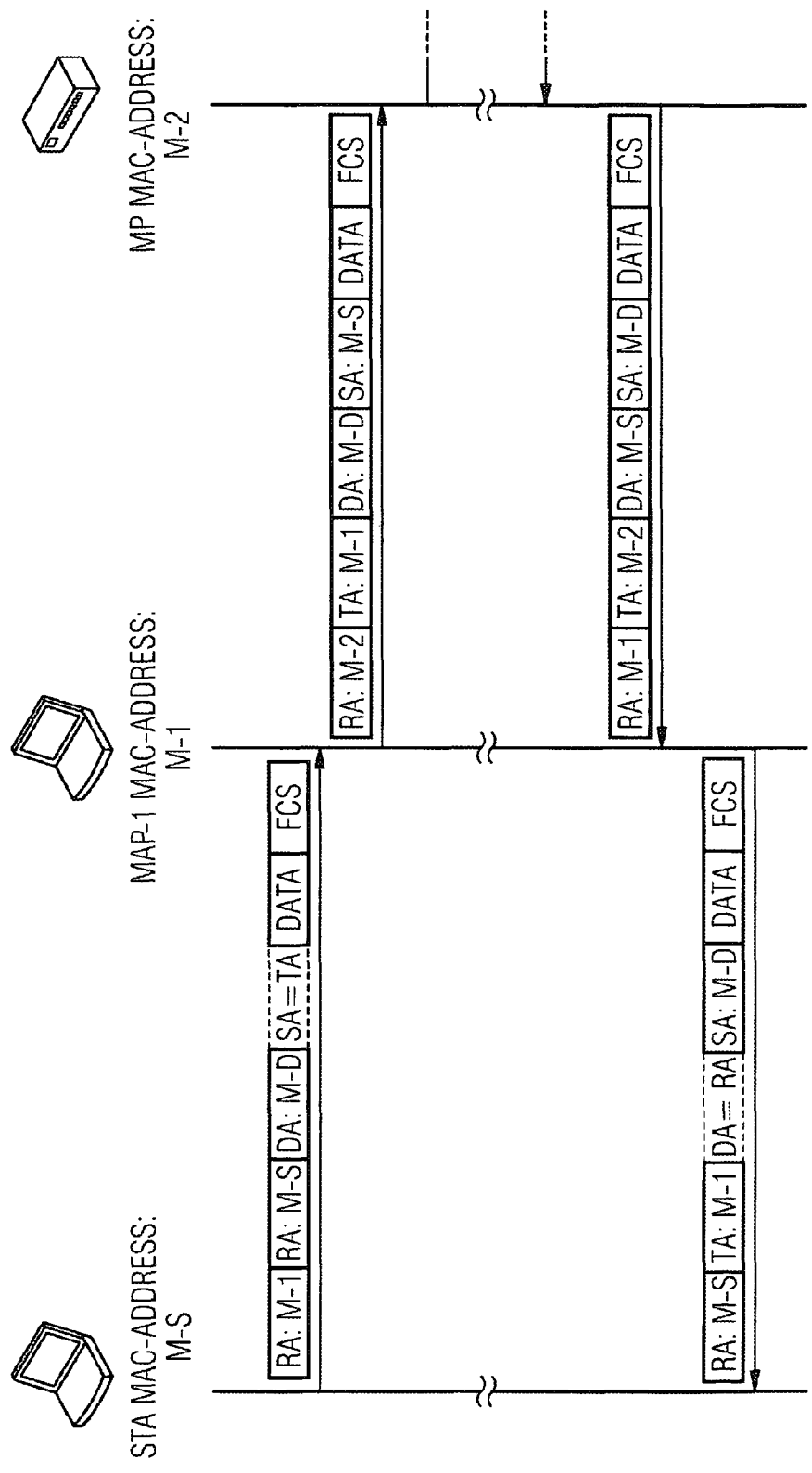
FIG. 11 shows a flow diagram of the forwarding of mesh data frames according to the prior art.

FIG. 11 shows the deployment of these MAC frames, the respective input being self-explanatory.

Figure 12:
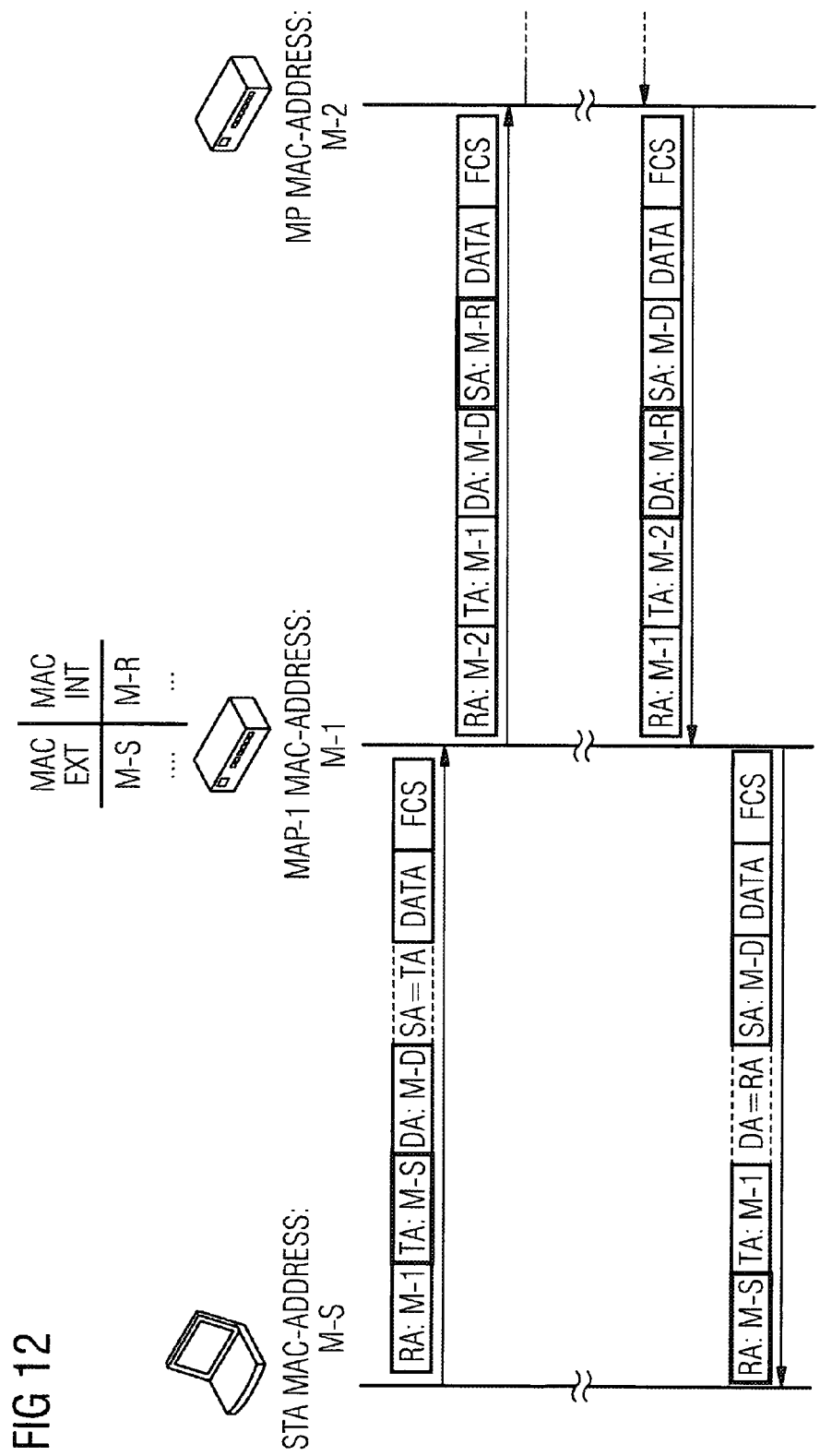
FIG. 12 shows a flow diagram with inventive address translation based on scenarios according to the prior art.

FIG. 12 finally shows the inventive conversion of the MAC address in the case of an already used or reachable address, based on this prior art.

It shows a conversion of the MAC address M-S of a non-mesh subscriber station STA to a MAC address M-R not used within the mesh network, e.g. generated in a pseudo-random manner, with "R" as random, on the part of a MAC address point MAP-1.

The conversion is therefore also to be seen as the replacement of the MAC address M-S given by the non-mesh subscriber station STA, with the conversion only affecting the transmitter address TA of MAC frames from the non-mesh subscriber nodes STA, which is identical to the source address SA, and in the case of MAC frames sent to the non-mesh subscriber nodes STA the receiver address RA, which is identical to the destination address DA.

It also shows the assignment table in the mesh access point, by way of which the non-mesh subscriber station STA registers. It shows that this contains entries which are used to store mesh-network-external MAC addresses (MAC EXT) to be mapped onto one another assigned respectively to mesh-network-internal MAC addresses (MAC INT).

In one variant the MAC address conversion or translation mentioned always takes place, in other words regardless of whether the MAC address indicated is already reachable or not.

The invention claimed is:

1. A method for providing a wireless local network comprising:
   transmitting a registering MAC address to a subnetwork by a communication entity registering with the subnetwork;
   a first node of the subnetwork comparing the registering MAC address with MAC addresses that are reachable via the subnetwork;
   upon a determination that the registering MAC address is disjoint of the reachable MAC addresses, the first node of the subnetwork connecting the registering communication entity in a manner of a station of the subnetwork; and
   upon a determination that the registering MAC address is not disjoint of the reachable MAC addresses such that the registering MAC address already is reachable via the subnetwork, the first node of the subnetwork implementing an approval procedure with the registering communication entity to prevent two different subscribers within the subnetwork having identical MAC addresses, the approval procedure comprising:
      the first node of the subnetwork sending a message to the registering communication entity that identifies a need for the registering communication entity to demonstrate ownership of the registering MAC address via a first route, the message sent by the first node of the subnetwork comprising a first item of check information, the first item of check information being transmitted as a hash code generated from a value produced as a pseudo-random code, the first route comprising a pre-existing route between the first node and a communication entity associated with the registering MAC address that is already reachable via the subnetwork;
      the registering communication entity sending a response message to the first node of the subnetwork via a second route that comprises the first item of check information in response to receipt of the message from the first node of the subnetwork the second route being a route to be established via registration of the registering MAC address,
      in response to receipt of the first item of check information via the second route, the first node of the subnetwork evaluating the received first item of check information to determine whether the received first item of check information received from the registering communication entity in the response message corresponds with stored check information associated with the registering MAC address.

2. The method as claimed in claim 1 wherein the subnetwork is a mesh network comprised of a plurality of mobile communication entities.

3. The method as claimed in claim 1 wherein the approval procedure includes a conversion of the registering MAC address such that a MAC address that is disjoint in respect of the reachable MAC addresses is allocated to the registering communication entity within the subnetwork.

4. The method as claimed in claim 3 wherein the converted disjoint MAC address is generated by a part of the subnetwork.

5. The method as claimed in claim 3 wherein the converted disjoint MAC address is generated based on a pseudo-random sequence.

6. The method as claimed in claim 3 wherein the converted disjoint MAC address is selected so that it is disjoint in respect of MAC addresses allocated universally as according to the OUI.

7. The method as claimed in claim 1 wherein bit 41 of the disjoint registering MAC address is allocated a value of 1.

8. The method as claimed in claim 1 wherein the approval procedure is initiated when the registering communication entity attempts to register with the first node of the subnetwork as a subscriber in a manner of a mesh network node.

9. A method for providing a wireless local network, in which stationary communication entities configured according to IEEE 802.15 standard or IEEE 802.16 standard and mobile communication entities are connected as a subnetwork in the manner of a mesh, comprising:
   transmitting a registering MAC address to a first node of the subnetwork by a communication entity registering with the subnetwork;
   the first node comparing the registering MAC address with MAC addresses that are already reachable on the subnetwork;
   upon a determination that the registering MAC address is disjoint in respect of the reachable MAC addresses, the first node connecting the registering communication entity in a manner of a station of the subnetwork, and
   upon a determination that the registering MAC address is already reachable in the subnetwork as a first communication entity of the subnetwork has a reachable MAC address that corresponds with the registering MAC address, implementing an approval procedure such that use of the registering MAC address by two different communication entities within the subnetwork is prevented;
      wherein the approval procedure includes an identity check carried out by the first node of the subnetwork on the identity of the registering communication entity, the identity check comprising:
      transmitting, by the first node of the subnetwork, a first item of check information to the first communication entity by way of a first route in the subnetwork such that the first item of check information is receivable by the registering communication entity via the first communication entity, the first item of check information being transmitted as a hash code generated from a value produced as a pseudo-random code;
      awaiting, by the first node of the subnetwork, a registration message from the registering communication entity that includes the first item of check information by way of a second route established in the context of the registration attempt on the part of the registering communication entity;

the first node rejecting the registering communication entity upon a determination that the first item of check information was not received, upon the first node receiving the first item of check information in the registration message sent from the registering communication entity via the second route, the first node checking a correlation of the first item of check information received from the registering communication entity with the first item of check information sent by the first node via the first route;

connecting the registering communication entity in a manner of the station of the subnetwork when at least a specific degree of correlation is achieved between the first item of check information of the message sent to the first node by the registering communication entity and the first item of check information sent by the first node to the registering communication entity; and rejecting the registering communication entity upon a determination that at least the specific degree of correlation is not achieved.

10. A method for providing a wireless local network, in which stationary communication entities configured according to IEEE 802.15 standard or IEEE 802.16 standard and mobile communication entities are connected as a subnetwork in the manner of a mesh, comprising:

transmitting a registering MAC address to a first node of the subnetwork by a registering communication entity attempting to register with the subnetwork;

the first node comparing the registering MAC address with MAC addresses that are already reachable on the subnetwork;

the first node connecting the registering communication entity in a manner of a station of the subnetwork when the registering MAC address is disjoint in respect of the reachable MAC addresses; and the first node implementing an approval procedure such that use of the registering MAC address by two different communication entities within the subnetwork is prevented when the registering MAC address is determined to already be reachable in the subnetwork, wherein the approval procedure includes an identity check carried out via the first node of the subnetwork on an identity of the registering communication entity wherein the identity check comprises:

receiving, by the first node of the subnetwork, a first item of check information from the registering communication entity by way of a first route in the subnetwork established in the context of the registration attempt of the registering communication entity, the first item of check information being transmitted as a hash code generated from a value produced as a pseudo-random code;

transmitting, by the first node of the subnetwork, a request to a first communication entity by way of the reachable MAC address of the first communication entity that is determined to correspond with the registering MAC address, the request requesting the first communication entity to send the first item of check information to the first node, awaiting, by the first node of the subnetwork, receipt of the first item of check information from the first communication entity by way of a second route in the subnetwork that comprises the first communication entity;

rejecting the registering communication entity when no receipt of the first item of check information occurs;

when the first node receives the first item of check information via the second route, the first node:

checking a correlation of the first item of check information received from the registering communication entity with the first item of check information received from the first communication entity via the second route, connecting the registering communication entity in the manner of a station of the subnetwork when at least a specific degree of correlation between the first item of check information from the registering communication entity and the first item of check information from the first communication entity is achieved, and rejecting the registering communication entity when at least the specific degree of correlation is not achieved.

11. A method for providing a wireless local network, in which stationary communication entities configured according to IEEE 802.15 standard or IEEE 802.16 standard and mobile communication entities are connected as a subnetwork in the manner of a mesh, comprising:

transmitting a registering MAC address to a first node of the subnetwork by a communication entity registering with the subnetwork;

the first node comparing the registering MAC address with MAC addresses that are reachable on the part of the subnetwork;

upon a determination that the registering MAC address is disjoint in respect of the reachable MAC addresses, the first node connecting the registering communication entity in a manner of a station of the subnetwork, and upon a determination that the registering MAC address is not disjoint, the first node implementing an approval procedure such that use of the registering MAC address by two different communication entities within the subnetwork is prevented, the implementing occurring when the registering MAC address is already reachable in the subnetwork, wherein the approval procedure includes a check carried out by the first node of the subnetwork to assess an identity of the registering communication entity that has the registering MAC address that corresponds with a reachable MAC address of a first communication entity of the subnetwork, the identity check comprising:

awaiting, by the first node of the subnetwork, for a first item of check information by way of a first route in the subnetwork established to the first communication entity and for a second item of check information by way of a second route in the subnetwork established in the context of the registration attempt from the registering communication entity, the first item of check information being transmitted as a hash code generated from a value produced as a pseudo-random code, rejecting the registering communication entity when the first item of check information fails to arrive within a predetermined amount of time, rejecting the registering communication entity when the second item of check information fails to arrive within a predetermined amount of time, checking a correlation of the first item of check information with the second item of check information for matching with each other after the first and second items of check information arrive, connecting the registering communication entity in the manner of a station of the subnetwork when at least a specific degree of correlation for matching with each other is achieved between the first item of check information with the second item of check information, and rejecting the registering communication entity when at least the specific degree of correlation is not achieved.

12. The method as claimed in claim 11 wherein a transmission of at least one of the first item of check information and second item of check information is initiated by the subnetwork.

13. The method as claimed in claim 11 wherein a transmission of at least one of the first item of check information and second item of check information is initiated on the part of the registering communication entity.

14. A method for providing a wireless local network, in which stationary communication entities configured according to IEEE 802.15 standard or IEEE 802.16 standard and mobile communication entities are connected as a subnetwork in the manner of a mesh, comprising:
    transmitting a registering MAC address to a first node of the subnetwork by a communication entity registering with the subnetwork;
    the first node comparing the registering MAC address with MAC addresses that are already reachable on the subnetwork;
    connecting the registering communication entity in a manner of a station of the subnetwork when the registering MAC address is disjoint in respect of the reachable MAC addresses; and
    implementing an approval procedure such that use of the registering MAC address by two different communication entities within the subnetwork is prevented when the registering MAC address is already reachable in the subnetwork, wherein the approval procedure includes an identity check carried out by the first node of the subnetwork on an identity of the registering communication entity corresponding with a first communication entity having a reachable MAC address corresponding to the registering MAC address, and
    wherein the identity check comprises:
        the registering communication entity determining a first item of check information based on a first cryptographic key authenticating the registering communication entity, the first cryptographic key being a first session key resulting from a network registration according to extensible authentication protocol (EAP) and available to the registering communication entity, the first item of check information being transmitted to the first node of the subnetwork by way of a first route in the subnetwork established in context of the registration attempt made by the registering communication entity, the first item of check information being transmitted as a hash code generated from a value produced as a pseudo-random code,
        the first node of the subnetwork attempting decryption of the first item of check information based on a second cryptographic key authenticating the first communication entity, the second cryptographic key being a second session key resulting from a network registration according to EAP of the first communication entity, and
        in the event of successful decryption of the first item of check information, the registering communication entity is connected in the manner of a station of the subnetwork, otherwise the registering communication entity is rejected.

15. The method as claimed in claim 14
    wherein at least one of the first session key and the second session key is generated as a master session key formed according to EAP or
    wherein at least one of the first session key and the second session key is generated as an extended master session key formed according to EAP.

16. A method for providing a wireless local network, in which stationary communication entities configured according to IEEE 802.15 standard or IEEE 802.16 standard and mobile communication entities are connected as a subnetwork in the manner of a mesh, comprising:
    transmitting a registering MAC address to a first node of the subnetwork by a communication entity registering with the subnetwork;
    the first node comparing the registering MAC address with MAC addresses that are already reachable on the subnetwork;
    the first node of the subnetwork connecting the registering communication entity in a manner of a station of the subnetwork when the registering MAC address is disjoint in respect of the reachable MAC addresses; and
    the first node implementing an approval procedure such that use of the registering MAC address by two different communication entities within the subnetwork is prevented when the registering MAC address is already reachable in the subnetwork,
        wherein the approval procedure includes a check carried out by the first node of the subnetwork on an identity of the registering communication entity, the identity check comprising:
    transmitting a first item of check information to the first node via an established route, the first item of check information calculated based on a first cryptographic key authenticating a first communication entity having a reachable MAC address corresponding with the registering MAC address, the first cryptographic key being a first session key resulting from a network registration according to extensible authentication protocol (EAP) and available to the registering communication entity, the first item of check information being transmitted as a hash code generated from a value produced as a pseudo-random code,
    the first node of the subnetwork attempting decryption of the first item of check information based on a second cryptographic key authenticating the registering communication entity, the second cryptographic key being a second session key resulting from a network registration according to EAP and being available to the first node of the subnetwork, and
    in the event of successful decryption, the registering communication entity is connected in the manner of a station of the subnetwork, otherwise the registering communication entity is rejected.

17. The method as claimed in claim 16 wherein a cryptograph hash function and/or a keyed hash function is used to calculate the first item of check information.

* * * * *